US009643670B2

(12) United States Patent
Pohjoisaho et al.

(10) Patent No.: US 9,643,670 B2
(45) Date of Patent: May 9, 2017

(54) ARRANGEMENT IN A FORESTRY MACHINE AND A FORESTRY MACHINE EQUIPPED WITH A CORRESPONDING ARRANGEMENT

(71) Applicant: Ponsse Oyj, Vieremä (FI)

(72) Inventors: Ossi Pohjoisaho, Iisalmi (FI); Jan Kauhanen, Iisalmi (FI); Risto Vidgren, Iisalmi (FI); Jukka Karppinen, Hernejarvi (FI); Pentti Hukkanen, Kiuruvesi (FI)

(73) Assignee: Ponsse Oyj, Vierema (FI)

( * ) Notice: Subject to any disclaimer, the term of this patent is extended or adjusted under 35 U.S.C. 154(b) by 220 days.

(21) Appl. No.: 14/399,142

(22) PCT Filed: May 29, 2013

(86) PCT No.: PCT/FI2013/050585
§ 371 (c)(1),
(2) Date: Nov. 5, 2014

(87) PCT Pub. No.: WO2013/178882
PCT Pub. Date: Dec. 5, 2013

(65) Prior Publication Data
US 2015/0083504 A1    Mar. 26, 2015

(30) Foreign Application Priority Data

May 31, 2012  (FI) ...................................... 20125597

(51) Int. Cl.
*B62D 61/12*    (2006.01)
*B60P 3/41*    (2006.01)
(Continued)

(52) U.S. Cl.
CPC ............... *B62D 61/12* (2013.01); *B60G 5/01* (2013.01); *B60G 5/025* (2013.01); *B60G 5/04* (2013.01);
(Continued)

(58) Field of Classification Search
CPC .......... B60G 2300/32; B60G 2204/423; B60G 2200/34; B60G 5/04; B62D 61/12; B62D 53/00; B62D 55/30; B60P 3/41
See application file for complete search history.

(56) References Cited

U.S. PATENT DOCUMENTS 3,494,632 A * 2/1970 Bostrom ................... B60G 5/01
180/22
3,744,857 A * 7/1973 Schoonover ........... B62D 55/30
180/9.5
(Continued)

FOREIGN PATENT DOCUMENTS

| FI | 873393 | 11/1988 |
|---|---|---|
| WO | 8704128 | 7/1987 |

(Continued)

OTHER PUBLICATIONS

International Search Report, dated Oct. 11, 2013, issued in International Application No. PCT/FI2013/050585 (4 pages).

*Primary Examiner* — Kevin Hurley
*Assistant Examiner* — Gabriela C Craciun
(74) *Attorney, Agent, or Firm* — Beem Patent Law Firm

(57) ABSTRACT

The invention relates to an arrangement in a forestry machine (100), in which arrangement there is —a chassis (12), —a single-axle set of wheels (13) pivoted to the chassis (12), and —at least one auxiliary wheel (18) fitted the outside the set of wheels (13), in order to increase the load-bearing capacity of the rear part (19) of the chassis (12). —The arrangement further includes —at least one support arm (20) arranged to carry the said auxiliary wheel (Continued)

Figure 1:
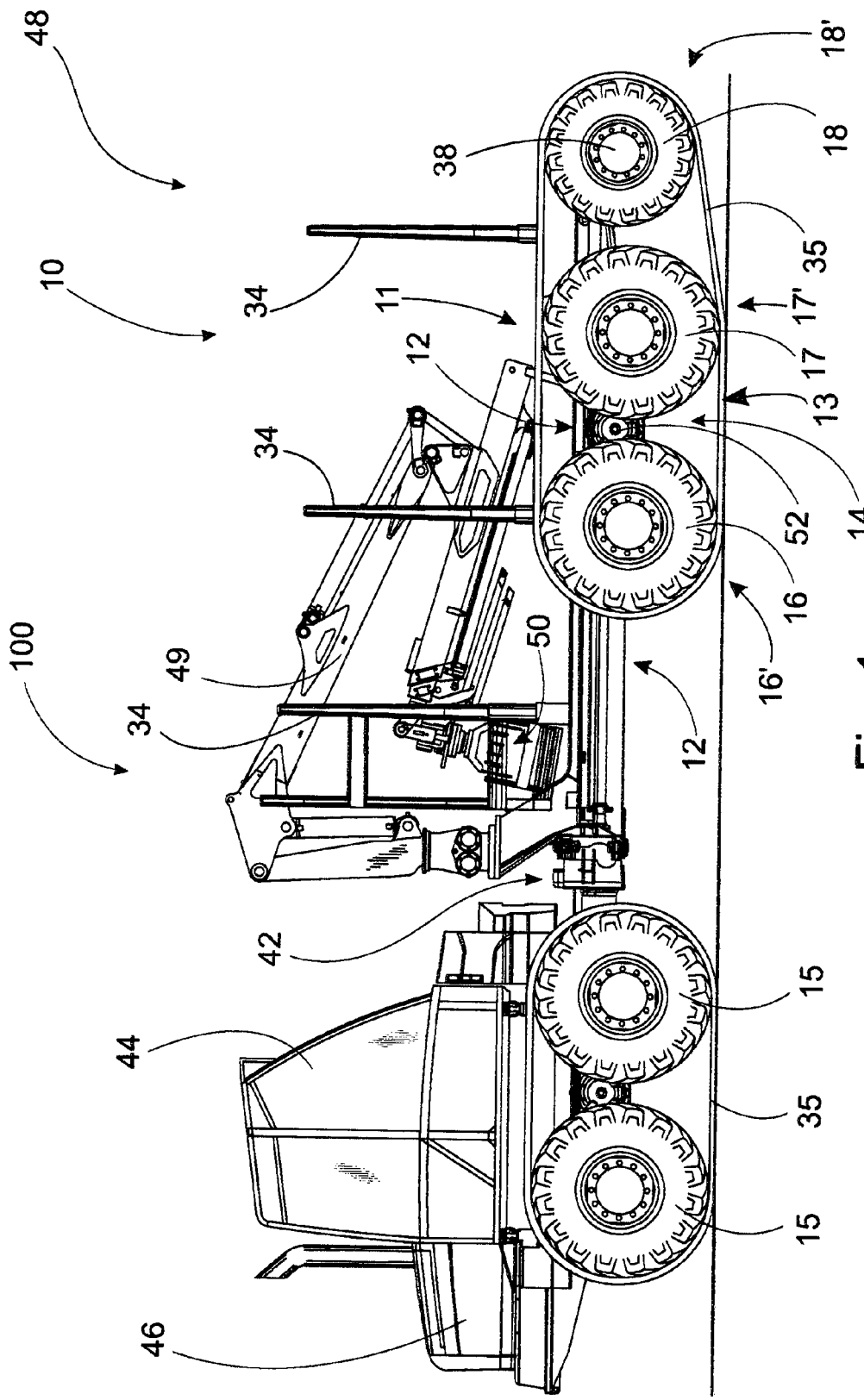

(18) at its first end (22) and pivoted at its second end (24) to the said chassis (12) with the aid of a transverse shaft (23), —a support surface (36) attached to the chassis (12) and a counter surface (38) attached to the said support arm (20), for limiting the transverse movement of the support arm (20). —The invention also relates to a corresponding forestry machine.

14 Claims, 11 Drawing Sheets

(51) Int. Cl.
| | |
|---|---|
| *B62D 53/04* | (2006.01) |
| *B62D 55/04* | (2006.01) |
| *B60G 5/01* | (2006.01) |
| *B60G 5/04* | (2006.01) |
| *B60G 5/06* | (2006.01) |
| *B60G 5/02* | (2006.01) |

(52) U.S. Cl.
CPC ............. *B60G 5/06* (2013.01); *B60P 3/41* (2013.01); *B62D 53/04* (2013.01); *B62D 55/04* (2013.01); *B60G 2200/34* (2013.01); *B60G 2204/423* (2013.01); *B60G 2300/083* (2013.01); *B60G 2300/32* (2013.01); *B60G 2300/402* (2013.01)

(56) References Cited

U.S. PATENT DOCUMENTS

| | | | | |
|---|---|---|---|---|
| 3,885,808 | A |  | 5/1975 | Derrwaldt |
| 4,084,833 | A | * | 4/1978 | Mohrbacker ............. F16F 7/02 180/24.02 |
| 4,219,210 | A | * | 8/1980 | Genberg ................ B62D 13/02 280/401 |
| 5,018,593 | A | * | 5/1991 | Hermann ............... B62D 61/12 180/24.02 |
| 5,163,698 | A | * | 11/1992 | Evens ...................... B60P 3/41 280/401 |
| 5,823,629 | A | * | 10/1998 | Smith ...................... B60G 9/02 180/209 |
| 5,897,123 | A | * | 4/1999 | Cherney .................. B60G 1/00 180/209 |
| 6,050,578 | A | * | 4/2000 | Beck .................... B62D 53/067 280/404 |
| 6,135,469 | A | * | 10/2000 | Hulstein .................. B60G 7/02 180/24.02 |
| 6,189,901 | B1 | * | 2/2001 | Smith ...................... B60G 9/00 180/209 |
| 6,247,713 | B1 | * | 6/2001 | Konop ................... B60G 9/003 180/209 |
| 7,175,189 | B1 | * | 2/2007 | Eull ....................... B62D 61/12 180/209 |
| 8,177,243 | B2 | * | 5/2012 | Boisture ................ B62D 61/12 280/81.6 |
| 8,523,202 | B1 | * | 9/2013 | Strong .................. B62D 61/12 180/209 |
| 2002/0014364 | A1 | * | 2/2002 | Bartlett ............. B60G 17/0523 180/209 |
| 2002/0014754 | A1 | * | 2/2002 | Konop ................... F16F 1/3863 280/86.5 |
| 2002/0033585 | A1 | * | 3/2002 | Konop ................... B62D 61/12 280/86.5 |
| 2007/0039766 | A1 | * | 2/2007 | Jackson ................ A61G 5/043 180/65.1 |
| 2010/0019464 | A1 | * | 1/2010 | Mcneilus ............... B62D 61/12 280/86.5 |
| 2010/0206648 | A1 | * | 8/2010 | Kelppe .................. B62D 55/04 180/9.1 |
| 2012/0305321 | A1 | * | 12/2012 | Wagger ................... B60G 5/01 180/9.52 |

FOREIGN PATENT DOCUMENTS

| | | |
|---|---|---|
| WO | 9114610 | 10/1991 |
| WO | 2009040472 | 4/2009 |

* cited by examiner

ARRANGEMENT IN A FORESTRY MACHINE AND A FORESTRY MACHINE EQUIPPED WITH A CORRESPONDING ARRANGEMENT

This application claims benefit of priority from International Patent Application No: PCT/FI2013/050585 filed May 29, 2013, which claims benefit of Finland Patent Application No. 20125597, both of which are incorporated by reference in their entirety.

The present invention relates to an arrangement in a forestry machine, in which arrangement there is
 a chassis,
 a single-shaft set of wheels pivoted to the chassis, and
 at least one auxiliary wheel fitted outside the set of wheels, in order to increase the load-bearing capacity of the rear part of the chassis.

The invention also relates to a forestry machine equipped with a corresponding arrangement.

The more efficient exploitation of bio-material, such as raw-material timber and energy timber, has made it necessary to collect bio-material more comprehensively from the ground. In the collection and transfer of bio-material, forestry machines are used, with the aid of which trees are felled, stripped, measured, cut, and forwarded. Generally, these first four stages are performed using a forestry machine, which is known as a harvester. The transfer can, for its part, be performed using a so-called forwarder. However, these forestry machines have in common a chassis structure, which usually consists of front and rear chassis attached to each other in an articulated manner. Which of the chassis is referred to as the front chassis can vary according to the application, but in the present case it will be agreed that the forestry machine's cab and primary power source are located in the front chassis. The steering of such a machine is usually implemented as so-called chassis-steering, in which steering operating devices, such as hydraulic cylinders, are fitted between the said articulated chassis to create the force required at any time to adjust the angle between the chassis.

Also common to forestry machines is that they move and work on various types of ground. As tree harvesting should be performed on forest ground that is increasingly weaker than previously, such as bogs and other peat-based ground, a need has been seen to minimize the surface pressure imposed by the machine on the ground. Various types of work machines and devices are known from the prior art, which are capable of travelling over ground with a low carrying capacity, for example, with the aid of wide and long crawler tracks. In the case of heavier machines, particularly forwarders, the aim of a low surface pressure has resulted mainly in the replacement of one or more of the machine's double-wheeled axles with a so-called set of swing-bogie axles, so that, for example, a four-wheeled machine is changed into an eight-wheeled machine. In forwarders, at least the axles under the load space are typically a set of bogie axles. The use of so-called tracks is also known, i.e. crawler tracks in connection with the swing-bogie axles referred to, which are arranged to run around the wheels of the bogie axles and thus give a larger load-bearing ground-contact surface area. One track solution of this type is disclosed in patent publication FI822636A.

Another solution representing the prior art is disclosed in publication FI 121111 B. In this solution, the forestry machine includes a set of swing-bogie axles and an auxiliary wheel attached to the chassis with the aid of a fixed axle. A crawler track runs around both the swing-bogie axles and the auxiliary wheel, and forms a good load-bearing support surface for the forestry machine. The pneumatic auxiliary wheel has a diameter that is smaller than that of bogie wheels of the swing-bogie axles, the tension of the crawler track being adjusted with the aid of the air pressure in the auxiliary wheel. A problem in such solutions is that most of the load-bearing capacity is obtained with the aid of the bogie wheels of the swing-bogie axles and the auxiliary wheel is of little importance in terms of load-bearing capacity, as it is in the air for most of the time. In addition, the use of a pneumatic auxiliary wheel to regulate the tension of the crawler track requires the use of low air pressure, which reduces the durability of the auxiliary wheel.

Also known from the prior art is publication U.S. Pat. No. 6,050,578, in which the trailer of a logging truck includes auxiliary wheels on a support arm, which can be raised when the trailer is being transferred empty. In this solution, the auxiliary wheel is, however, attached by two support arms, which are at a distance from each other. The distance between the support arms makes the total support-arm structure wide. However, the suspension of the auxiliary wheels is so weak that it cannot be used in forestry vehicles.

The invention is intended to create an arrangement in a forestry machine, with the aid of which a lower surface pressure against the ground and better handling than solutions of the prior art can be achieved. The characteristic features of the arrangement according to the present invention are stated in the accompanying claims. The invention is also intended to create a better forestry machine than previously. The characteristic features of the forestry machine according to the present invention are stated in the accompanying claims.

This intention can be achieved by means of an arrangement in a forestry machine, in which arrangement there is a chassis, a single-axed set of wheels pivoted to the chassis, and at least one auxiliary wheel fitted to the rear part of the chassis outside the set of wheels, in order to increase load-bearing capacity. The arrangement further includes at least one support arm arranged to support the auxiliary wheel at its first end and is pivoted at the second end to the chassis with the aid of a transverse shaft, as well as a support surface attached to the chassis and a counter-surface attached to the support arm, for limiting the transverse movement of the support arm. With the aid of the support surfaces, the support arm can be supported on the chassis without the massive bearing supports that an unsupported structure would require.

The single-axle set of wheels is preferably a set of bogie wheels pivoted to the chassis with the aid of a swing bogie. A set of bogie wheels is economical to use and implement, compared to individual supports for the wheels.

The set of bogie wheels can include at least two pairs of bogie wheels. In this way, the use of a set of bogie wheels will achieve good load-bearing capacity even on soft ground.

The set of bogie wheels is preferably driven. This will increase the forestry machine ability to move in a forest.

The auxiliary wheel is preferably mounted in bearings to rotate freely. A freely rotating auxiliary wheel can be implemented simply and relatively lightly.

The arrangement preferably includes a pair of auxiliary wheels. With the aid of a pair of auxiliary wheels the load-bearing capacity can be increased and the auxiliary wheels can be connected to the set of bogie wheels with the aid of a crawler track.

The support surface is preferably at right angles relative to the transverse shaft. Thus the support surface will prevent only the transverse movement of the support arm, without causing friction in the vertical movement.

According to one embodiment, the arrangement includes one support arm arranged to support two auxiliary wheels. When implemented with the aid of an individual support arm, the suspension of the pair of auxiliary wheels can be implemented reliably and sturdily.

According to a second embodiment, the arrangement includes two separate support arms each arranged to carry one auxiliary wheel. Thus, the auxiliary wheels can be supported separately, so that they can also move out of step with each other to suit unevennesses in the ground. This will reduce the forces acting on the support arms, as the suspension of an auxiliary wheel will cause less torsion in the support arm, as the axle of the auxiliary wheel will be shorter than when using a single support arm.

Between the separate support arms there can be at least one support surface for supporting the support arms on each other in longitudinal direction of the shaft of the support arm. Thus, the support arms will still be securely supported on each other and from the other side of the support arm on the chassis beams.

In the arrangement, the chassis can include two parallel beams at a distance from each other and the support arm can be fitted between the chassis beams. Between the chassis beams, the support arm will be protected from impacts and knocks while the construction of the support arm can be implemented without widening the overall structure of the chassis. In addition, the support arm is preferably placed in such a way that the space above the chassis beams will remain free for a load space, i.e. the support arm will always be lower than the level of the upper surface of the beams over the length of the forestry vehicle's chassis.

The support surface preferably includes at least one plate attached to the chassis essentially transversely to the support arm, in which plate there is a runner permitting the vertical movement of the support arm. With the aid of the plate, the support arm can be supported while simultaneously advantageously stiffening the chassis.

The arrangement can further include an operating device between the support arm and the chassis for moving the pair of auxiliary wheels in an essentially vertical direction according to the intended use. In this connection, the term an essentially vertical direction refers to the sector of the curve of the circle formed when the support arm moves, which in the normal movement of the support arm is nearly vertical. With the aid of the operating device, the raising of the auxiliary wheel in the air takes place simply and can also be performed by remote control from the cab of the forestry machine.

According to one embodiment, the arrangement includes a crawler track running around both a set of bogie wheels and an auxiliary wheel. With the aid of the crawler track, a considerable increase in load-bearing capacity can be achieved, which is necessary when moving on soft and boggy surfaces.

The arrangement can include resilient elements associated with the crawler track, arranged to maintain the tension of the crawler track when the swing bogie rotates. The resilient elements are preferably formed mainly of the resilience of the auxiliary wheel. Thanks to the resilient elements, the tension of the crawler track will remain more or less constant, which will increase the service life of the crawler tracks.

According to one embodiment, the bogie wheels are pneumatic rubber tyres and the reduced pressure in the auxiliary wheel is 60-95%, preferably 80-90% of the pressure in the pneumatic rubber tyres of the bogie wheels. In this way, sufficient resilience is created to maintain the tension of the crawler track despite the movements of the swing bogie.

The pair of auxiliary wheels can have a smaller diameter than the pair of bogie wheels, the side of an auxiliary wheel can be 75-95%, preferably 80-90% of the size of a bogie wheel. The size of the auxiliary wheel will then be sufficient to increase the load-bearing capacity, but nevertheless sufficiently small that the weight of the forestry machine will not increase excessively.

The support surface and the counter surface are preferably situated closer to the centre-point of the auxiliary wheel than the shaft between the support arm and the chassis, in which case a large lateral moment will not arise in the support arm, but only in the runner acting as a support surface.

The auxiliary wheel can be arranged to be raised off the ground by 10-25%, preferably 13-17% of its diameter while the forestry machine is turning. In this way, the turning circle of the forestry machine will be improved considerably. In addition, the auxiliary wheel can be raised into the air when driving on a solid surface, for example during road transportation.

The support arm is preferably pivoted directly to the chassis. The arrangement can then be implemented using the least possible number of components.

The support arm's counter surface is attached to the support arm at a distance from the first end of the support arm, which distance is 10-50%, preferably 20-30% of the length of the support arm. Thus the transverse forces of the support arm are directed to the support surface and the loading between the support arm and the chassis remain small.

According to a second embodiment, the support arms can be supported from their outer sides on runners attached to the chassis beams. In this way each support arm is supported from both sides.

Figure 2A:
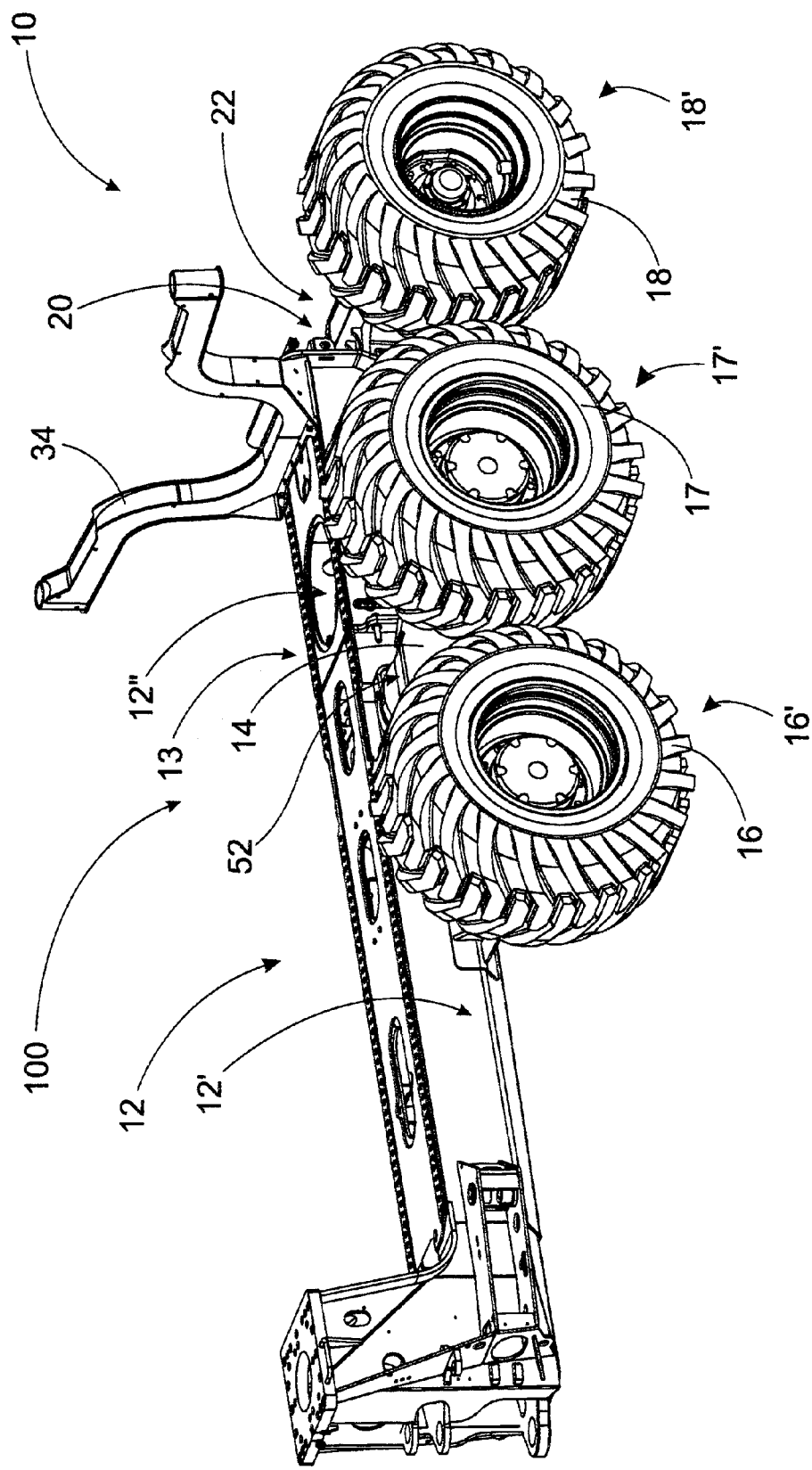
Figure 2B:
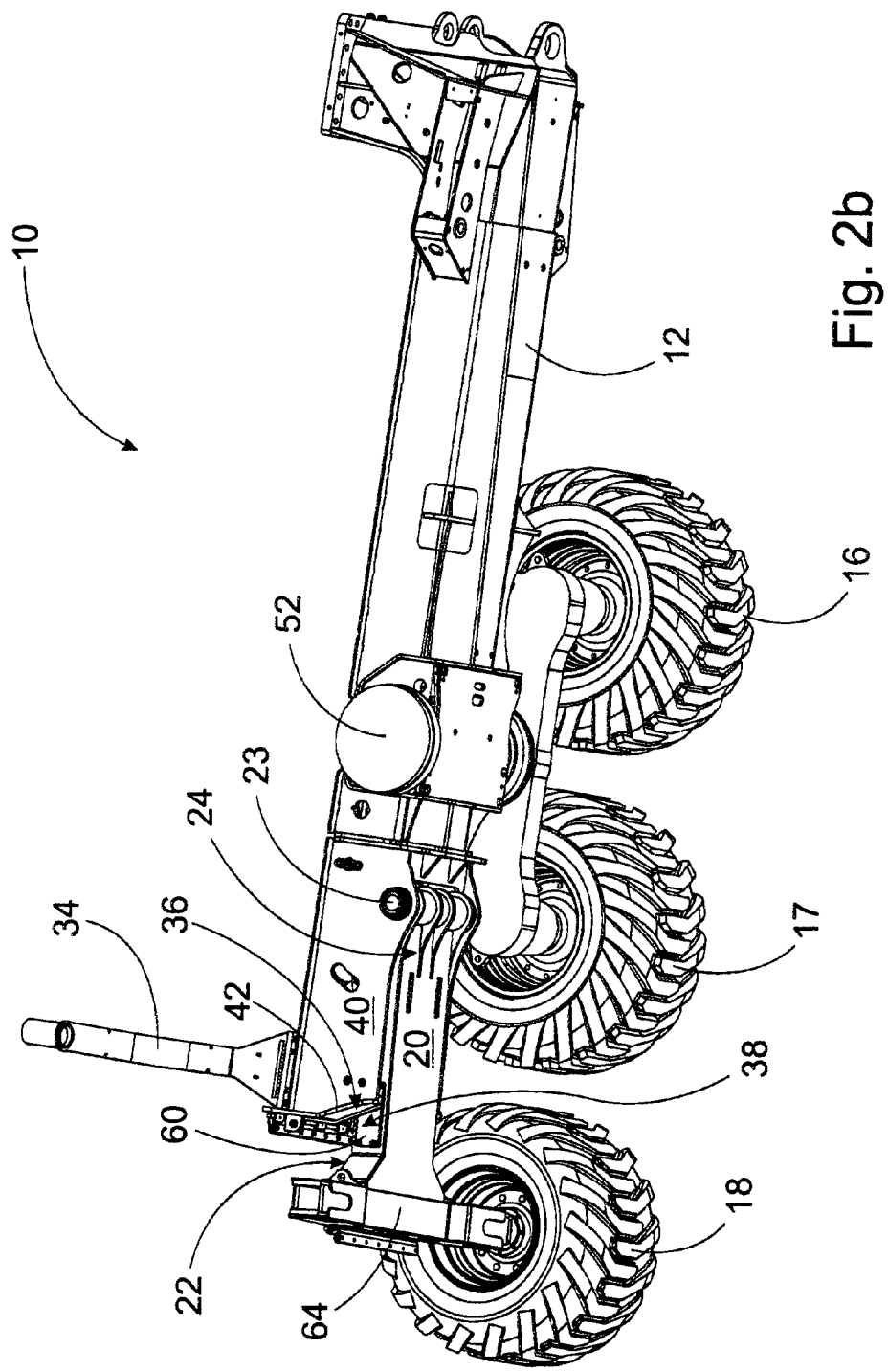
Figure 2C:
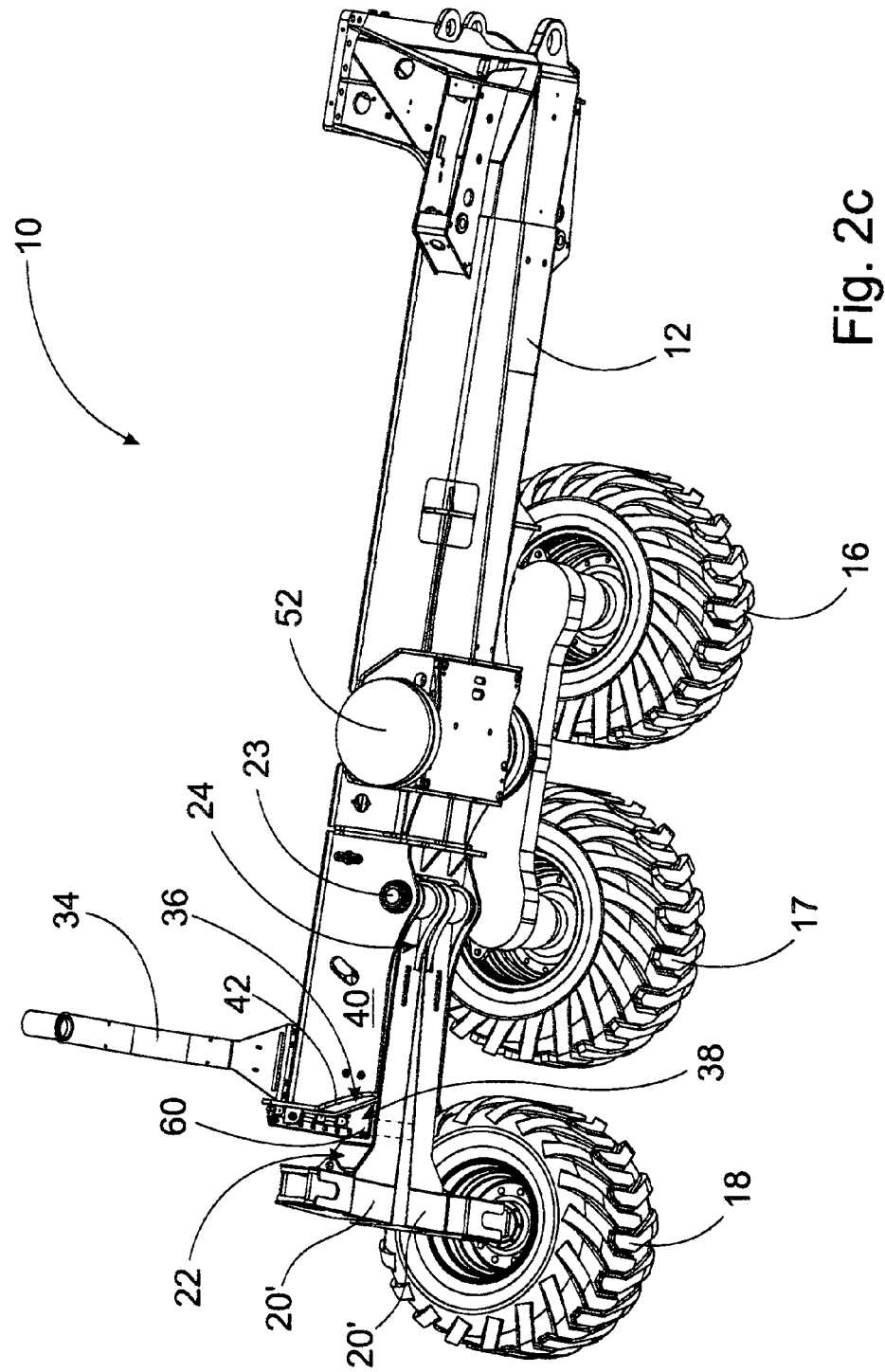
Figure 3:
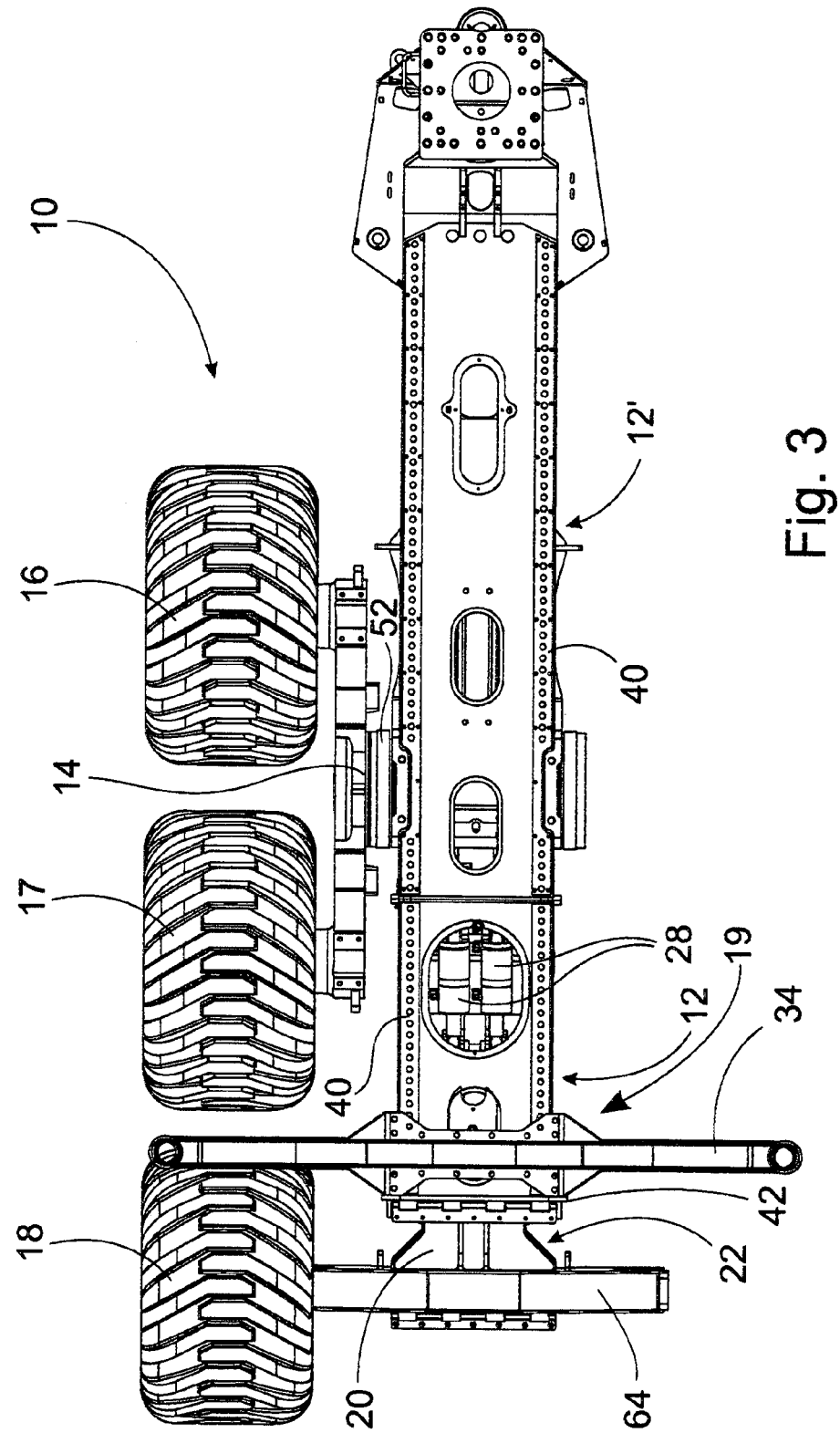
Figure 4A:
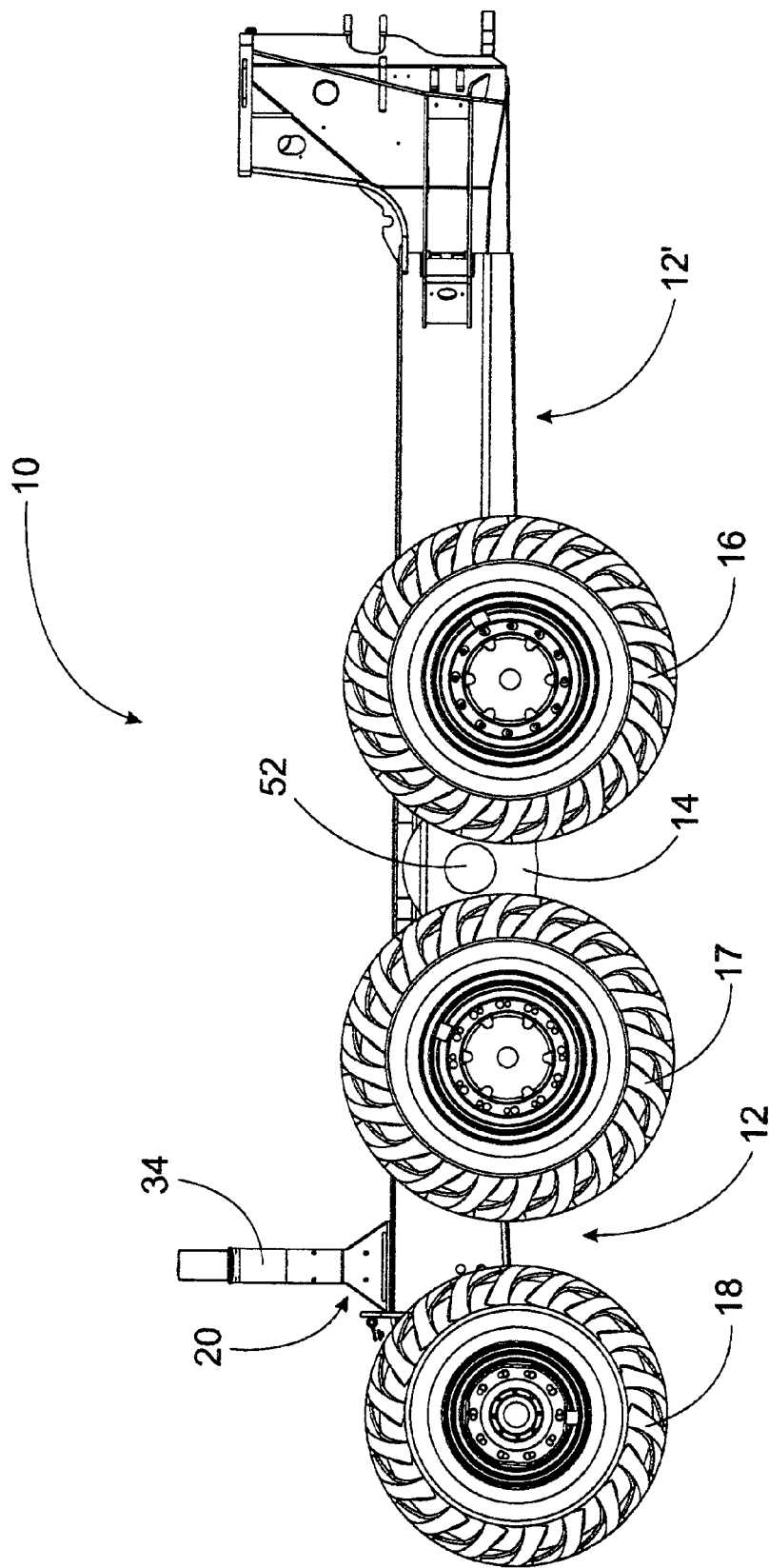
Figure 4B:
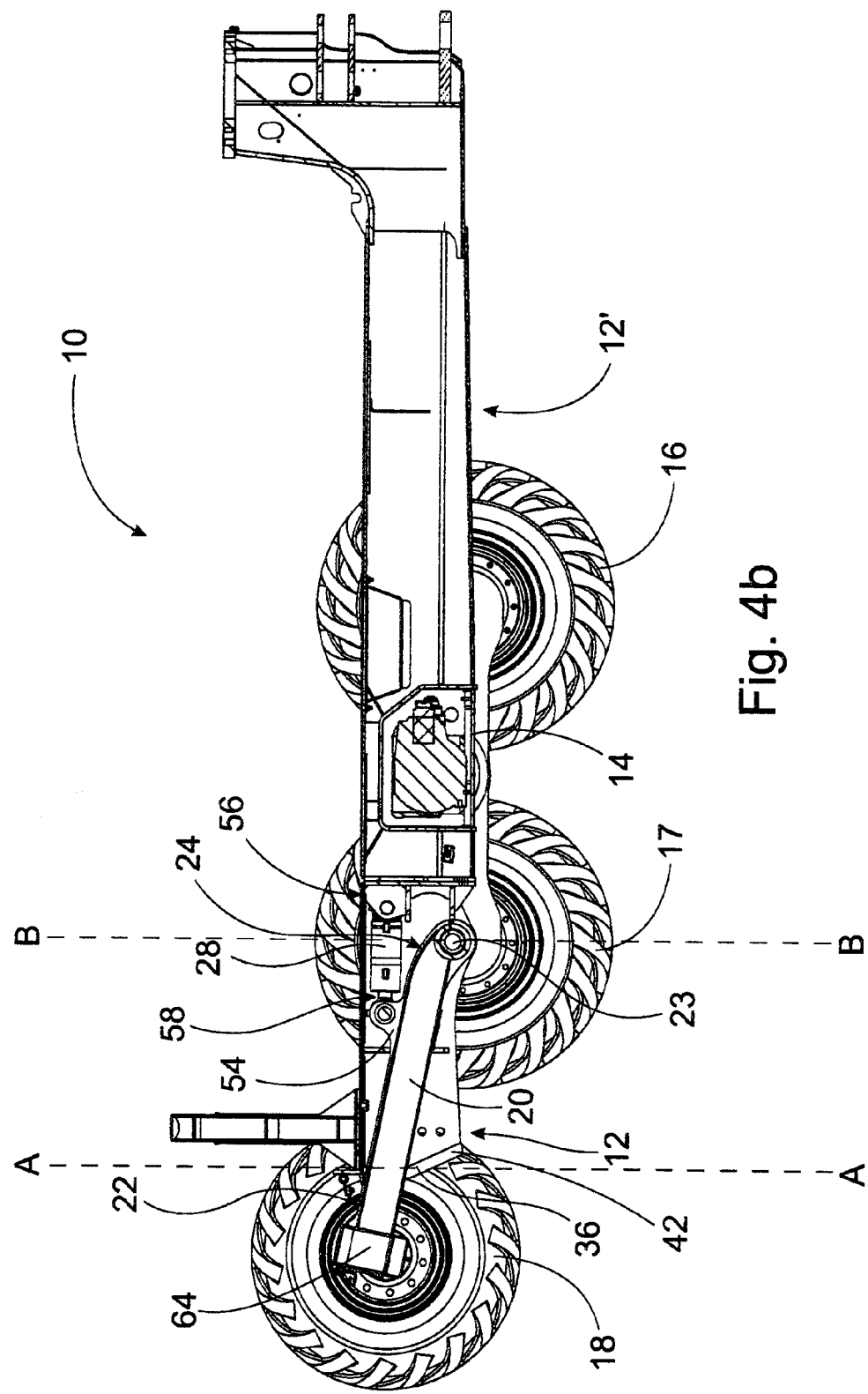
Figure 5A:
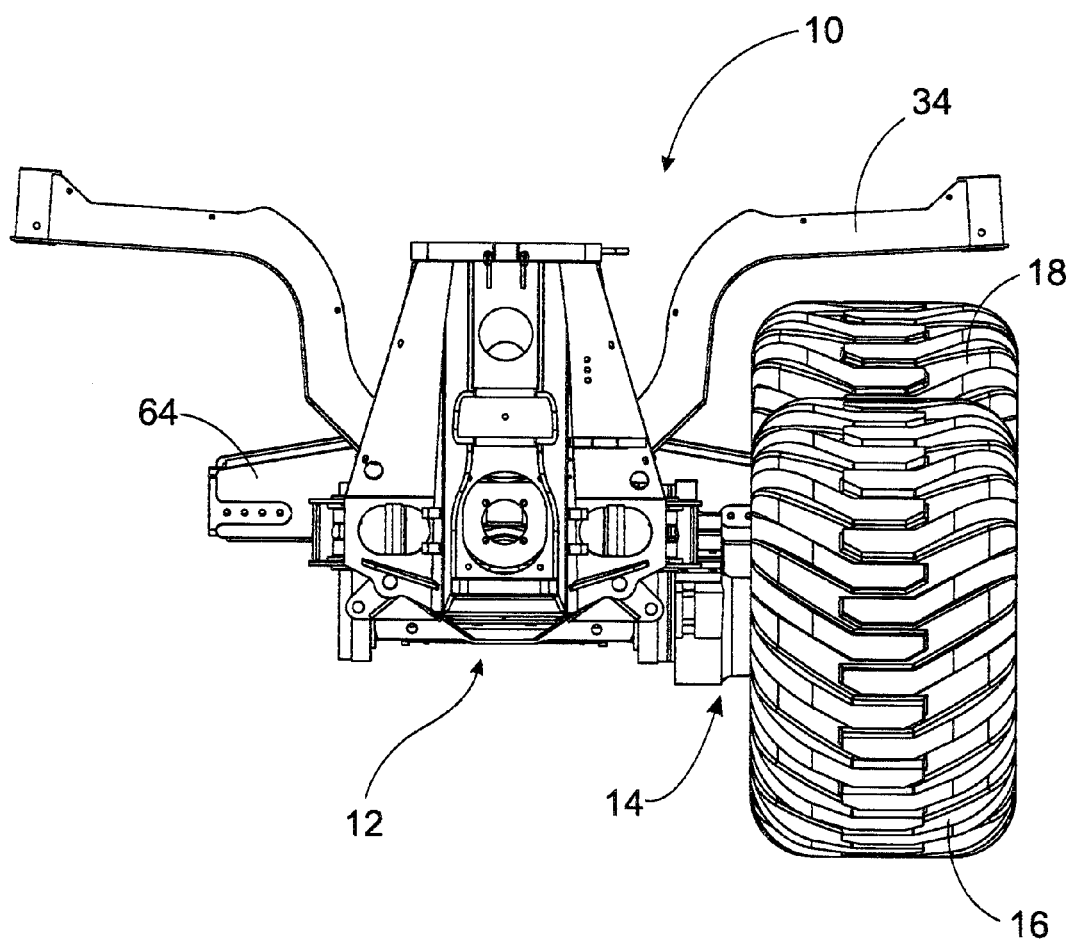
Figure 5B:
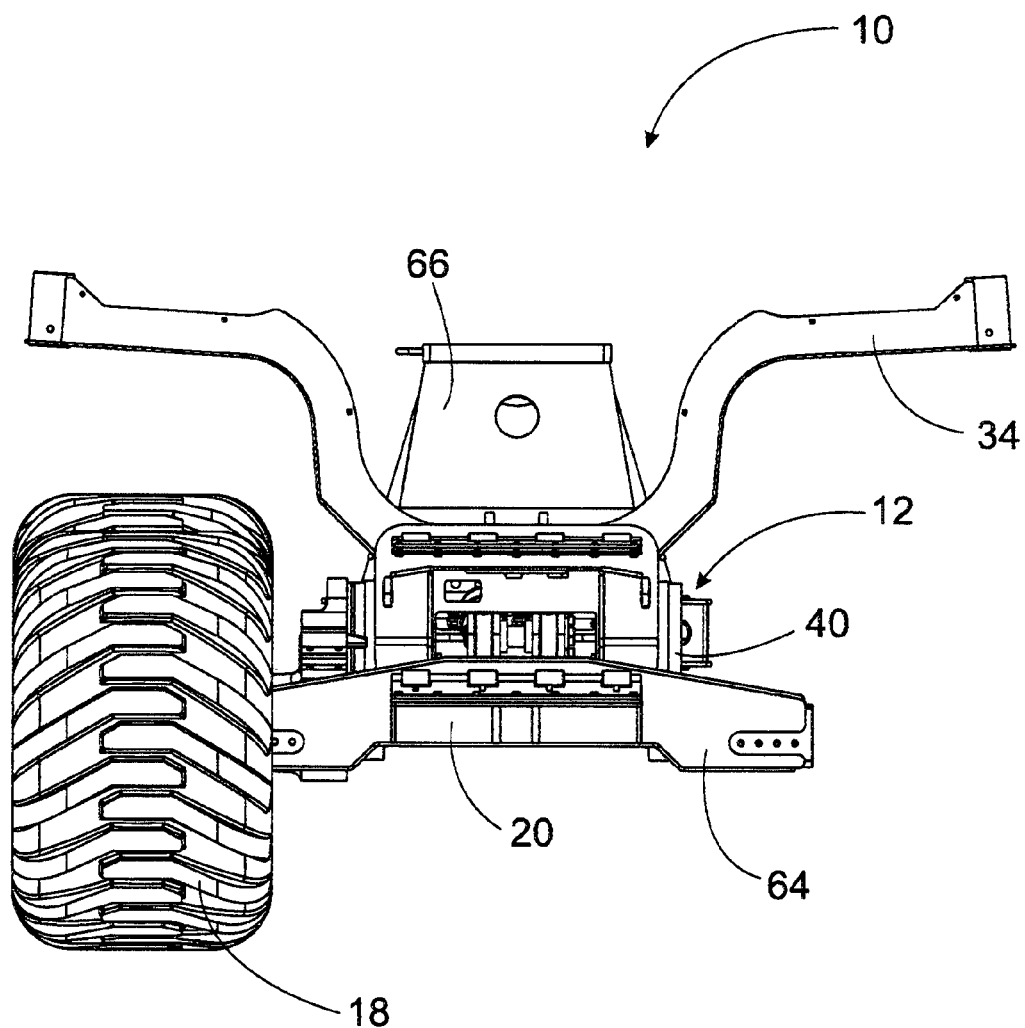
Figure 5C:
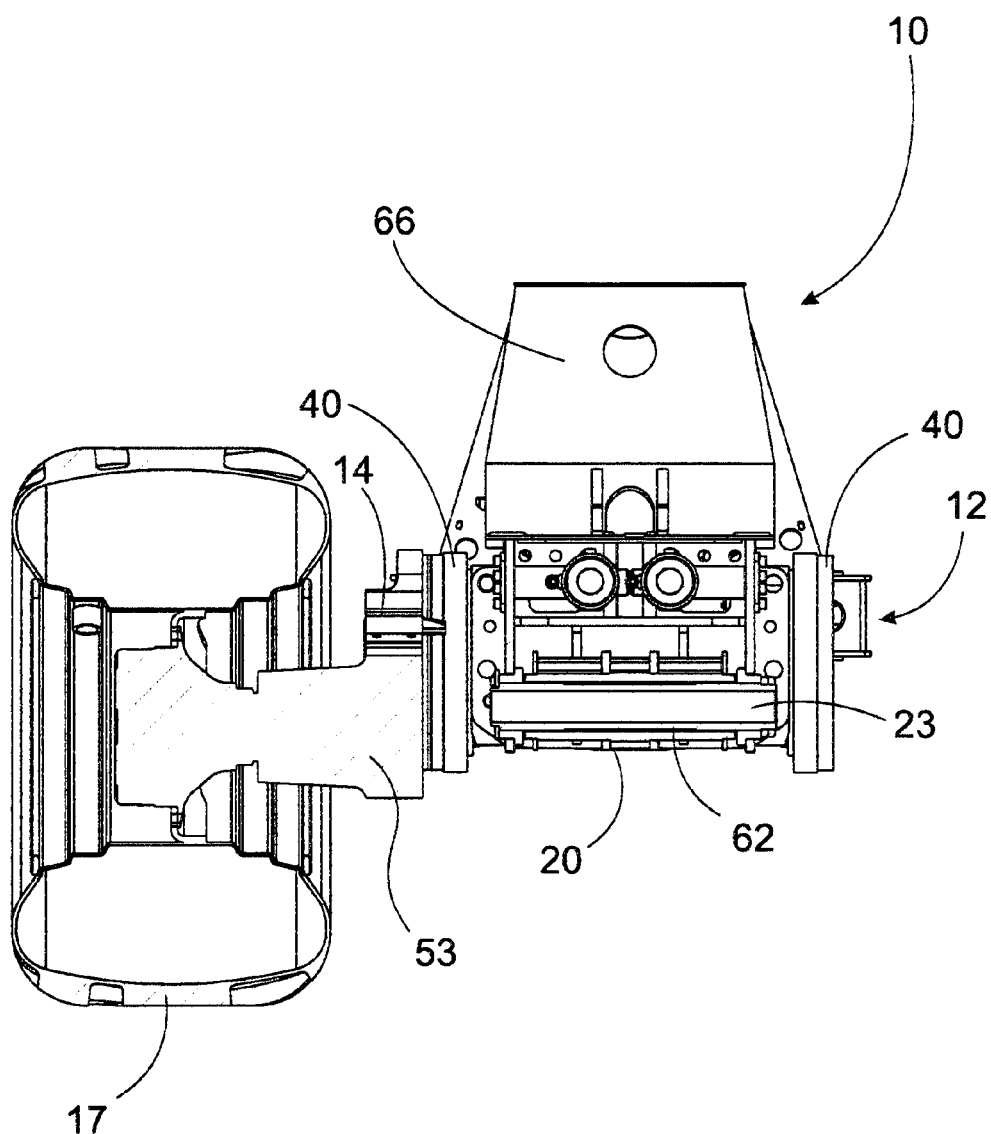
Figure 5D:
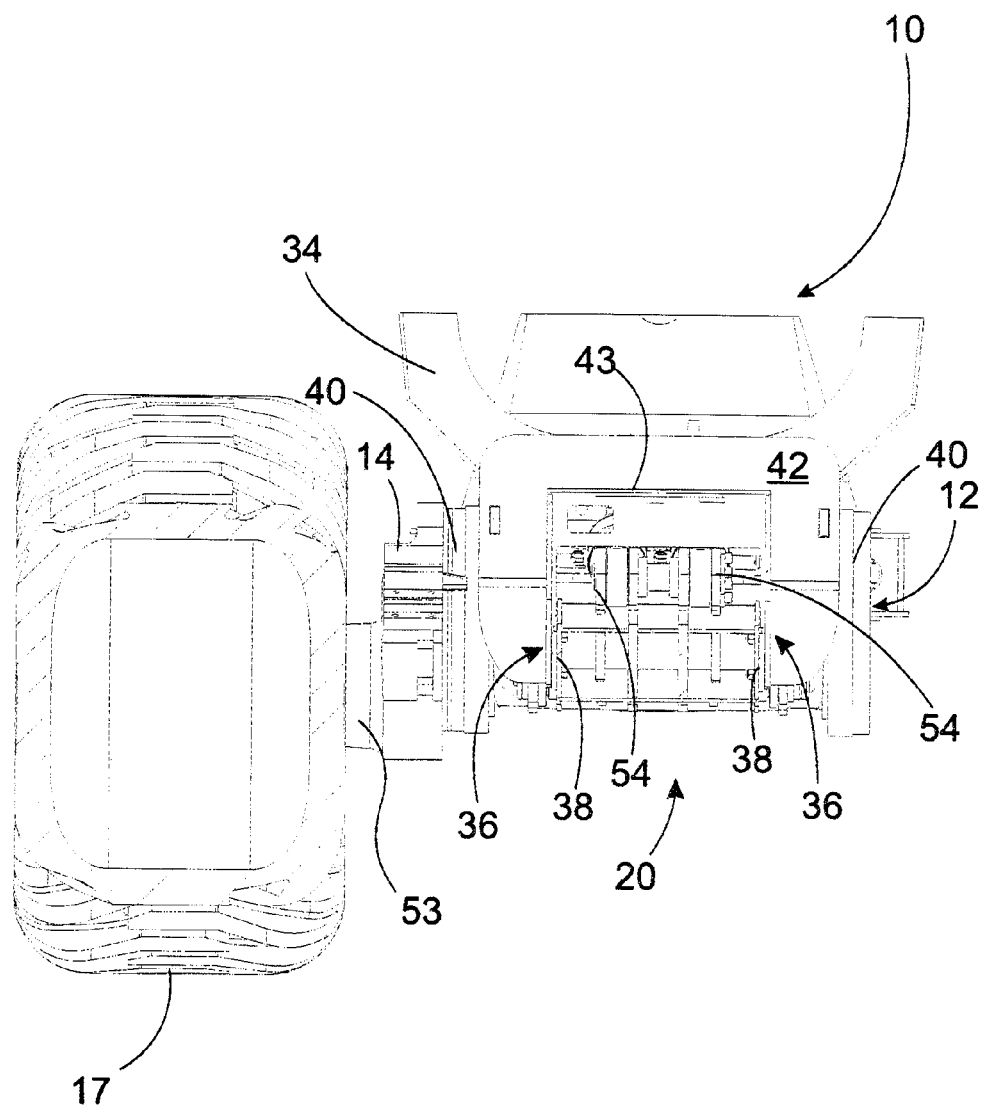

In the following, the invention is described in detail with reference to the accompanying drawings showing some embodiments of the invention, in which FIG. 1 shows a side view of the arrangement according to the invention, as a schematic diagram, FIG. 2a shows an axonometric top view of one embodiment of the arrangement according to the invention, FIG. 2b shows an axonometric bottom view of one embodiment of the arrangement according to the invention, FIG. 2c shows an axonometric bottom view of a second embodiment of the arrangement according to the invention, FIG. 3 shows a top view of one embodiment of the arrangement according to the invention, FIG. 4a shows a side view of one embodiment of the arrangement according to the invention, with the auxiliary wheel lowered, FIG. 4b shows a side view of one embodiment of the arrangement according to the invention, with the auxiliary wheel raised, FIG. 5a shows a front view of one embodiment of the arrangement according to the invention, with the auxiliary wheel raised, FIG. 5b shows a rear view of one embodiment of the arrangement according to the invention, with the auxiliary wheel lowered, FIG. 5c shows a cross-section B-B of FIG. 4b, and FIG. 5d shows a cross-section A-A of FIG. 4b.

FIG. 1 shows one embodiment of the arrangement according to the invention in a forestry machine 100. In this embodiment, the forestry machine 100 is a forwarder, in which there is a chassis 12 articulated by a vertical pivot 42, in front of which vertical pivot 42 there is an engine 46 and a cab 44. Behind the vertical pivot there is, in turn, the load space 48 of the forwarder and a set of booms 49, with a grab 50, attached in front of the load space. The load space 48 can be simply a totality consisting of banks 34 for timber, or, for example, a container equipped with sides. In practice, the wheels 15, 16, and 17 of the forwarder always have a drive, so that the forwarder's ability to progress in variable ground conditions is always good. In the embodiment shown in FIG. 1, crawler tracks 35, with the aid of which the forwarder's load-bearing capacity in boggy ground can be increased, are installed around both the wheels 15, the pairs of bogie-wheels 16' and 17', and the pair of auxiliary wheels 18'. In terms of the implementation of the invention a crawler track is not essential, but is used in the preferred embodiment.

The arrangement according to the invention relates to a single-axle set of wheels 13 of a forestry machine, preferably to the bogie wheels 16 and 17 of pairs of bogie wheels 16' and 17' as well as to auxiliary wheel 18. In the embodiments shown in the figures, the single-axle set of wheels 13 is a set of bogie wheels 11 and there are two auxiliary wheels 18, forming a pair of auxiliary wheels 18'. The wheels 16 and 17 are bogie wheels, which are pivoted with the aid of their axles 53 (in FIG. 5c) on the swing bogie 14 of the set of bogie wheels 11. The swing bogie 14 is, for its part, pivoted by a bogie axle 52 to the chassis 12 of the forestry machine 100, according to FIGS. 1 and 2. The construction of the swing bogies can be similar to solutions known from the prior art. An auxiliary wheel 18 is further pivoted to the rear of the bogie wheels 16 and 17 of the swing bogie 14. The diameter of the auxiliary wheel 18 is preferably smaller than that of the bogie wheels 16 and 17 of the swing bogie 14 and it is intended to increase the load-bearing capacity of the forestry machine in difficult ground conditions. According to the invention, the auxiliary wheel 18 is pivoted to a support arm, which is in turn pivoted to the chassis 12. The auxiliary wheel is pivoted to the rear part 19 of the chassis (shown in FIG. 3). In this connection, the term rear part refers to the opposite end of the chassis of the forestry machine to that with the cab, assuming that the cab is at one end of the chassis according to FIG. 1. With the aid of the support arm, the auxiliary wheel can be raised and lowered to different heights, as required. There can be a single support arm, which is arranged to carry both auxiliary wheels, or the arrangement can include two separate support arms, each of which carries one auxiliary wheel.

FIGS. 2-5d show only the wheels on one side, but naturally wheels are located on both sides of the chassis of the forestry machine. In this connection, reference to a wheel in the singular generally also refers to a pair of wheels on both sides of the chassis. The chassis 12 of the forestry machine can consist according to FIG. 2a of two parts, the actual chassis 12' and an extension 12" to the chassis, to which the pair of auxiliary wheels 18' is attached. Thus the auxiliary wheel and the chassis extension can also be connected to the chassis of existing forestry machines without auxiliary wheels. The chassis of the forestry machine can also be unified.

According to FIGS. 2a-3, the support arm has a first end 22 and a second end 24, the support arm 20 being pivoted at second end 24 to the chassis 12 with the aid of a shaft 23, preferably between the beams 40. In other words, the support arm 20 is preferably pivoted inside the chassis 12, where it is protected from external impacts. In addition, in this way the support arm can be implemented without widening the overall structure of the chassis. A pair of auxiliary wheels 18' is, for its part, pivoted to the first end 22 of the support arm 20. The support arm 20 can be operated, i.e. raised and lowered, with the aid of an operating device 28. The operating device 28 is preferably a hydraulic cylinder, which has a first end 56 and a second end 58, which hydraulic cylinder is pivoted at its first end 56 to the chassis 12 of the forestry machine above the axle 23 and at the second end 58 to a lug 54 in the support arm, according to FIG. 4b.

According to one embodiment, the support arm may also be implemented using two separate support arms, which are outside the chassis beams of the chassis. In such a case, the support arms can be supported from their internal surfaces on the chassis beams and from their external surfaces on separate runners. Further, the invention can alternatively be implemented using two separate support arms, which are on the inside of the chassis. In that case, each auxiliary wheel can move independently, so that, for example, the wheels can move at different levels on uneven ground. There can be sliding surfaces between the support arms. The forces that arise in the support arm, and travel around its longitudinal direction will remain small.

Because the support arm 20 is attached to the chassis 12 only with the aid of the shaft 23, the support arm 20 must also be supported laterally to entirely or partly limit the longitudinal movements and/or torsion of the shaft 23. For this purpose the arrangement 10 between the chassis' 12 beams 40 includes a support surface 36 (in FIG. 4b) attached to the chassis 12 and a counter surface 38 (in FIG. 2b) attached to the support arm 20, for preventing transverse movement of the support arm 20. According to FIG. 5d, the support surface 36 is preferably at least one essentially transverse plate 42 in the longitudinal direction of the beams 40, which includes a runner 43. The width of the runner 43 is essentially the width of the support arm and the edges of the runner 43 act as a support surface 36 for the counter surface 38.

According to FIG. 2b, the support arm can be manufactured as a narrow component that fits inside the chassis beams, so that the distance between the support points supporting the shaft on the chassis will be small. For this reason, it is particularly important for the support arm to be supported closer to the axle of the auxiliary wheels attached to the support arm than to the shaft between the support arm and the chassis, so that forces in the support arm parallel to the axle of the auxiliary wheels will be received with the aid of the support surfaces. The counter surface of the support arm is preferably attached to the support arm at a distance from the first end of the support arm, which distance is 10-50%, preferably 20-30% of the length of the support arm. In addition, with the aid of the support the support arm can be of a light construction, for example a box structure.

The counter surface 38 can be preferably a slider piece 60 attached to the support arm 20, which permits a smooth sliding vertical movement of the support arm 20. It can be seen from FIG. 2b how the slider piece 60 acting as the counter surface is attached to the side of the support arm 20. The slider piece 60 extends on both sides of the plate 42 acting as the support surface 36. There can also be more than one support surface. Thus, the forces exerted by the long support arm on the shaft 23 and its bearings are received already with the aid of the support surfaces 36, so that the bearing mountings between the support arm 20 and its shaft 23 and its bearing 62 can be of a light construction.

Forces that are transverse to the longitudinal direction of the support arm arise when driving over unevennesses in the ground, which lead to forces parallel to the axle of the wheels. These forces are now received by the support surfaces, which are preferably made as sliding surfaces. Journal or rolling bearings can also act as support surfaces. Replaceable slider pieces, which are easy to change when they wear, can be used as the counter surfaces.

In the arrangement according to the invention, the pivoting of the support arm to the chassis is preferably made in such a way that the shaft between the support arm and the chassis can be replaced and can be locked to be fixed relative to the chassis of the forestry machine. The support arm can then be mounted on bearings around the shaft. Alternatively, the shaft can be fixed relative to the support arm, in which case the bearings will be between the shaft and the chassis.

FIG. 2c shows a second embodiment of the invention, in which the support arm 20 is formed of two L-shaped separate support arms 20', which are supported on each other with the aid of support surfaces. One example of a located for the support surfaces is shown by broken lines. In a case in which the auxiliary wheel 18 on one side is on top of a stone, considerably smaller forces will act on separate support arms 20 than on a single support arm. In such a case, the auxiliary wheel on one side of a unified support arm would be in the air and thus causing a large amount of torsion on the support arm. In the case of separate support arms 20' according to FIG. 2c, one separate support arm 20' can rise according to the ground independently of the other separate support arm 20'. With the aid of support surfaces between the separate support arms 20', the separate support arms 20' are well supported against lateral forces, even if the separate support arms 20' are in different positions relative to each other. There is preferably a separate operating device for each of the separate support arms, in order to operate the separate support arms independently. There can also be locking devices between the separate support arms, by means of which the separate support arms can, if necessary, be locked to form a single support arm.

According to FIG. 3, the support arm is preferably narrower than the chassis 12 of the forestry machine by the width of the chassis' 12 beams 40, so that it will fit between the beams 40. In addition, the support arm should also be narrower than the distance between the chassis beams by the thickness of the support surface and the counter surface. The support arm can be formed of two beams corresponding to the chassis beams, which are secured to each other by surface and bottom plates as well as by a shaft and the support shaft between the auxiliary wheels 18 and its support structures 64. The auxiliary wheels 18 can be pivoted to the support arm 20 with the aid of a support shaft, which is in turn attached to a transverse support structure 64 in the longitudinal direction of the support arm 20. With the aid of the transverse support structure 64, the auxiliary wheels can be arranged to the same track width as the bogie wheels, despite the narrow structure of the support arm 20. The main shape of the support arm is preferably straight, so that it can be manufactured to be as light as possible.

The height of the support arm is preferably such that, when it moves in the runner against the counter surfaces, the height of the support arm prevents the support arm from rotating around its longitudinal axis due to the forces of unevennesses acting on the auxiliary wheels. The distance between the upper and lower surface of the support arm, i.e. the height of the support arm, can be 10-40 cm, preferably 20-30 cm.

FIG. 4a shows a side view of a cross-section of an embodiment of the arrangement according to the invention, when the auxiliary wheel 18 is on the ground. The lowering of the auxiliary wheel onto the ground can be implemented with the aid of gravity or an operating device. When the piston of the hydraulic cylinder moves outwards in the cylinder, the support arm turns downwards and the auxiliary wheel drops closer to the ground. The operating device preferably includes movement limitation chains or similar, with the aid of which the maximum length of the operating device can be limited (not shown). According to FIG. 4b, the operating device 28 is pivoted at its first end 56 to the chassis 12 and at its second end 58 to the support arm 20 with the aid of a lug 54. The attachment of the first end 56 of the operating device 28 to the chassis 12 is higher than the shaft 23 of the support arm 20 by means of which the support arm 20 is pivoted to the chassis 12. In this way, the operating device 28 obtains the moment arm necessary for rotating the support arm 20. This moment arm can be increased by making the support arm's 20 lug 54 higher. According to one embodiment, the support arm can be telescopic, in which case the distance of the auxiliary wheel relative to the bogie wheels can be adjusted.

FIG. 4b shows a side view of a cross-section of an embodiment of the arrangement according to the invention, when the auxiliary wheel 18 is off the ground. The raising of the auxiliary wheel is performed by shortening the operating device 28, i.e. in this case by feeding oil to the hydraulic cylinder in such a way that the piston retracts into the cylinder and the piston rod rotates the support arm 20 around the shaft 23. At the same time, the first end 22 of the support arm 20 rises and the auxiliary wheel 18 rises off the ground. The rising of the auxiliary wheel 18 can be limited by the bank 34.

In the arrangement according to the invention, the auxiliary wheel 18 can be locked against the ground with the aid of the operating device 28. Optionally, the auxiliary wheel 18 can be raised into the air with the aid of the operating device 28. The operating device 28 can further include a floating function, with the aid of which the auxiliary wheel can float according to the ground, i.e. it adapts freely to the ground. The best load-bearing capacity is achieved when the auxiliary wheel is locked down, whereas with the auxiliary locked up the best turning circle is achieved. A constant pressure or varying pressure can be used in the operating device for the raising or lowering of the support arm. The pressure used can be relative to some measurable variable. The operating device, or possibly operating devices of the arrangement can also be manufactured to be such that they permit the set of bogie wheels to be raised in the air with the aid of the pair of auxiliary wheels. In that case, crawler tracks or chains can be used in the swing bogie also during road driving, when the weight of the rear chassis of the forestry machine will rest on the pair of auxiliary wheels.

When using a crawler track 35 in the arrangement around the wheels 16, 17, and 18, the crawler track 35 must always be kept tensioned irrespective of the position of the swing bogie 14. For this purpose, the arrangement preferably includes resilient elements, with the aid of which the change in the tension in the crawler track, caused by the movement of the swing bogie, can be compensated. The resilient elements are preferably implemented in such a way that the auxiliary wheel is a pneumatic rubber wheel, by changing the pressure in which it is possible to influence the tension in the crawler track. When the swing bogie moves around its axle, the compressed-air filled part of the auxiliary wheel gives way. With the aid of an auxiliary wheel pivoted at the end of the support arm, the tension in the crawler track can also be influenced by the position of the support arm, so that the tension in the crawler track remains essentially constant. By changing the position of the support arm, the tension in the crawler track changes, in which case not so much resilience brought by the auxiliary wheel will be needed. This will permit a higher pressure to be used in the auxiliary wheel, which in turn will increase the durability of the auxiliary wheel.

According to one embodiment of FIGS. 5a and 5b, the size of the auxiliary wheel can be 75-95%, preferably 80-90%, of the size of a wheel of the swing bogie. A sufficient increase in load-bearing capacity will then be achieved by means of the auxiliary wheel, but the increase in the weight of the forestry machine will be moderate. The reference number 66 refers to the centre pivot's of the forestry machine joint support of the rear chassis of the forest machine, shown in FIGS. 2a-5d.

With the aid of the raisable auxiliary wheels, the durability of the auxiliary wheels can also be improved. If necessary, the auxiliary wheels can be raised into the air, so that strains are not directed to them. Generally, the auxiliary wheels are lowered onto the ground when using the forestry machine on soft surfaces, for example bogs. The auxiliary wheels are generally raised when driving on more load-bearing surfaces, and also during road transportation. When the auxiliary wheels are raised off the ground, the turning circle of the forestry machine can be improved. According to one embodiment, the said auxiliary wheel is arranged to be raised off the ground into the air by 10-25%, preferably 13-17% of its diameter while the forestry machine is being turned.

With the aid of the operating device, the auxiliary wheel can be locked into the position on the ground, when it will act as an ordinary additional wheel. Alternatively, the operating device can include a pressure safety valve, with the aid of which the pressure of the operating device can be lowered, if the pressure inside the operating device increases excessively. Such a situation can occur, for example, when crossing a ditch, where the forestry machine can remain suspended between the auxiliary wheel and the front wheels. With the aid of the safety valve, the auxiliary wheel's operating device, the control valves, and other hydraulics can be protected from damage. In principle, the operation of the safety valve can be understood as a kind of flexing function when the auxiliary wheel floats, i.e. when the surface pressure of the auxiliary wheel rises excessively, the auxiliary wheel 'gives way', i.e. the support arm rises when the operating device releases pressure through the safety valve. In the arrangement, one or more operating devices can be used. There are preferably two operating devices, in which case the strains acting on the operating device will remain reasonable.

The auxiliary wheel can be fitted to any point whatever in the forestry machine, nor does the auxiliary wheel need to be the last wheel in the forestry machine as in FIGS. 1-5d. The auxiliary wheel can also be used in front of the swing bogie. The support arm of the arrangement can also be in two parts and located outside the chassis beams, in which case the separate support arms will be supported on the outer sides of the chassis beams and the support arms will be connected by a separate transverse support. Alternatively, the support arms can be supported from their inner edges on the outer sides of the chassis beams and from their outer edges on runners attached to the chassis beams. Each separate support arm carries one auxiliary wheel. The support arm can also be telescopic, in which case the distance from the auxiliary wheel to the bogie wheels can be altered.

The support arm can be manufactured from steel or a corresponding material, which withstands the forces acting on it. The support arm can also be a box structure. The attachment of the support arm can be made according to the figures by means of a shaft between the support arm and the chassis, for example, about at the location of the axle of the rear wheel of the swing bogie. The length of the support arm is preferably at least equal to the diameter of a swing-bogie wheel, in which case the auxiliary wheel will be at a suitable distance from the swing bogie. In the arrangement, the wheels of the swing bogie and the auxiliary wheel are arranged to permit the use of a crawler track.

According to one embodiment, the set of single-axle wheels can be a set of wheels similar to that depicted in FIG. 1 of publication WO 91/14640, in which each wheel is pivoted to the chassis with the aid of an individual sprung arm. The sprung arm permits the wheel to flex a little in a corresponding manner to a set of bogie wheels. In such an embodiment, the auxiliary wheel and rearmost wheel can be surrounded by a crawler track on both sides of the chassis.

According to a second embodiment, in the arrangement according to the invention there are be only a single auxiliary wheel, which is supported on the chassis with the aid of a support arm. In this case, the support arms are preferably situated in such a way that the auxiliary wheels is pivoted between two support arms, at the first ends of the support arms. The second ends of the support arms can, for their part, be pivoted either inside or outside the chassis beams, as long as the support arms are supported on the chassis in the transverse direction with the aid of support surfaces and counter surfaces.

The raising and lowering of the support arm can be performed by remote control from the cab of the forestry machine, in the same way as the other control operations.

The invention claimed is:
1. A forestry machine comprising:
   a chassis having a rear part;
   a swing bowie having a rigid bogie frame;
   a single-axle set of bogie wheels pivoted to the chassis with the aid of the rigid bogie frame, where the set of bogie wheels is driven;
   at least one auxiliary wheel fitted outside the set of wheels, in order to increase the load-bearing capacity of the rear part of the chassis;
   at least one support arm arranged to carry the auxiliary wheel at its first end and pivoted at its second end to the said chassis with the aid of a transverse shaft; and
   support surface attached to the chassis and a counter surface attached to the at least one support arm to limit the transverse movement of the support arm.
2. The forestry machine according to claim 1, where said set of bogie wheels includes at least two pairs of bogie wheels.
3. The forestry machine according to claim 1, where the auxiliary wheel is mounted in bearings to rotate freely.
4. The forestry machine according to claim 1 further comprising a pair of auxiliary wheels.
5. The forestry machine according to claim 1, where said support surface is perpendicular relative to the transverse shaft.
6. The forestry machine according to claim 1 where the at least one support arm is arranged to carry two auxiliary wheels.
7. The forestry machine according to claim 1 further comprising a second support arm separate from the at least one support arm and arranged to carry a second auxiliary wheel.
8. The forestry machine according to claim 1 where the chassis includes two parallel beams at a distance to each other, where at least one of the at least one support arms is fitted between the beams of the chassis.

9. The forestry machine according to claim 1 where the support surface includes at least one plate attached to the chassis substantially transversely to the support arm, where the at least one plate is a runner permitting the vertical movement of the support arm.

10. The forestry machine according to claim 1 further comprising an operating device between the support arm and the chassis, the operative device for moving the pair of auxiliary wheels in an essentially vertical direction according to an intended use.

11. The forestry machine according to claim 1, where said support surface and said counter surface are located closer to the centre point of the auxiliary wheel than to the shaft.

12. The forestry machine according to claim 1 where the counter surface of the support arm is attached to the support arm at a distance from the first end of the support arm that is 10-50%, of the length of the support arm.

13. The forestry machine according to claim 1 further comprising a crawler track running around both the set of wheels and the at least one auxiliary wheel.

14. The forestry machine according to claim 12, where the distance is 20-30% of the length of the support arm.

* * * * *